(12) United States Patent
Wessel

(10) Patent No.: US 7,010,198 B2
(45) Date of Patent: Mar. 7, 2006

(54) BIREFRINGENCE TRIMMING OF INTEGRATED OPTICAL DEVICES BY ELEVATED HEATING

(75) Inventor: Rudolf Wessel, Stuttgart (DE)

(73) Assignee: Avanex Corporation, Fremont, CA (US)

(*) Notice: Subject to any disclaimer, the term of this patent is extended or adjusted under 35 U.S.C. 154(b) by 139 days.

(21) Appl. No.: 10/714,444

(22) Filed: Nov. 14, 2003

(65) Prior Publication Data

US 2004/0165826 A1    Aug. 26, 2004

(30) Foreign Application Priority Data

Nov. 14, 2002 (EP) .................................. 02360311

(51) Int. Cl.
*G02B 6/42*    (2006.01)

(52) U.S. Cl. ............................. 385/40; 385/11; 385/14

(58) Field of Classification Search .................. 385/2, 385/8, 11, 14, 28, 40–42, 129–132
See application file for complete search history.

(56) References Cited

U.S. PATENT DOCUMENTS 4,978,188 A * 12/1990 Kawachi et al. ............ 385/130
6,760,499 B1 * 7/2004 Pezeshki et al. .............. 385/14

* cited by examiner

*Primary Examiner*—Phan T. H. Palmer
(74) *Attorney, Agent, or Firm*—Patterson & Sheridan LLP

(57) ABSTRACT

The present invention relates to a method for trimming birefringence of an integrated optical device with at least one waveguide having a birefringence characteristic, comprising the steps of providing at least one electrode on top of the waveguide, and applying power equal to or above a predetermined power level to said at least one electrode for causing a change of the refractive indices of the waveguide.

14 Claims, 2 Drawing Sheets

BIREFRINGENCE TRIMMING OF INTEGRATED OPTICAL DEVICES BY ELEVATED HEATING

This application claims priority from European patent application number 02360311.1 filed Nov. 14, 2002.

The present invention relates to a method for trimming birefringence of an integrated optical device with at least one waveguide having a birefringence characteristic. Further, the present invention relates to an optical device for switching or filtering light passing through a waveguide having a birefringence characteristic.

Optical devices, particularly optical switches and more generally optical filters, play an increasingly important role as today's optical networks become more complex and carry more capacity. Switches can be deployed in applications such as network protection and restoration and dynamically reconfigurable add/drop modules; optical cross connects for example may incorporate such applications. The field of application of optical filters is even broader. Optical filters may be employed in nearly every kind of optical element, like multiplexers, demultiplexers, optical add drop multiplexers, chromatic or polarization mode dispersion compensators, gain equalizers etc.

In the art, several switching technologies are available. One of these technologies is based on totally internal reflection and planar light wave circuit (PLC), e.g. thermo-optic switches, where light is guided in planar waveguides. Materials such as silica and polymers exhibit the thermo-optic effect, i.e. the refractive indices change as the temperature is changed. This thermo-optic coefficient could either be positive like silica or negative like polyimide. This type of switch is fast enough for protection and restoration purposes, compact and well-suited for integration with other PLC-components, such as arrayed waveguide gratings (AWG), to form more complicated modules like optical add/drop multiplexes. These thermo-optic effect based devices have been used in telecom systems either as switches or as variable optical attenuators. One design of a thermo-optic switch consists of a Mach-Zehnder interferometer (MZI) with a thin-film phase shifter deposited on the waveguide arms of the interferometer. The phase of the optical waves traveling in the interferometer can be tailored by heating the waveguide. With the heater off, the upper and lower waves travel in the interferometer arms at the same speed, recombined in phase at the output coupler and the input signal exits the switch on one output port (cross state). When the heater is on, refractive index of the waveguide is slightly modified (the thermo-optic effect) causing the two waves to recombine out of phase and the input signal exits the switch on a second output port (bar state). One benefit of this design is that, by controlling the amount of power applied to the heater, the signal can be broadcasted to both output ports.

In contrast to the aforementioned optical switches, optical filters are elements which guide the light within two optical paths (planar waveguides) of different length (asymmetric structure). Generally, there are FIR (finite impulse response) filters and IIR (infinite impulse response) filters. FIR-filters have in common that light travels along a finite path, whereas the light travels along a infinite path in IIR-filters. FIR-filters are e.g. based on Mach-Zehnder interferometers, arrayed waveguide grating devices, etc. IIR-filters are e.g. based on ring resonators, Fabry-Perot resonators, etc. Of course, combinations of FIR- and IIR-filters are contemplated, like an MZI with a ring resonator.

With all optical filter devices, polarization dependence is a critical concern, particularly if the free spectral range (FSR) of the filter device is small. In the art certain approaches to adjust the refractive indices for TE- and TM-polarized waves (birefringence) have been proposed in order to bring the birefringence to zero.

The standard technique for the fabrication of silica-based PLCs incorporating an optical filter device with a low birefringence (small difference between refractive indices of TE- and TM-polarized wave) is to use a highly doped cladding material to balance the stresses for the TE and TM polarization. With this technique, it is possible to fabricate integrated optical devices with a TE-TM shift of about +/−4 GHz. Thus, if the FSR of the optical filter is in the same range of only a few GHz, a polarization dependence of the device can not be avoided by the standard fabrication process. The optical device will always exhibit a stress-induced birefringence which is generally above a desired value. However, the difference between the effective refractive index of the TE polarized wave and the TM polarized wave (birefringence) causes a deviation in the phase depending on the polarization directions. As a result, there is the problem that the interferometer does not function as an optical frequency division multi-/demultiplexer at all, unless the polarization direction of an optical signal is previously adjusted to a direction either parallel to or vertical to the surface of the substrate.

Hence, it is of great importance to adjust the birefringence of silica-based waveguides and to change the polarization dependence of integrated optical devices after the standard fabrication process. One approach for adjusting or trimming the birefringence is for example disclosed in the paper "Birefringence Control of Silica Waveguides on SI and Application to a Polarization-Beam Splitter/Switch", M. Okuno et al., Journal of Light Wave Technology, vol. 12, no. 4, pp. 625–633, (1994).

The birefringence trimming proposed in this paper is performed by fabricating a stress applying film above the optical waveguide and changing this stress applying film by a laser ablation. The disadvantage of this approach is that it requires the deposition of a stress applying thin film (amorphous silicon) and a laser trimming process. Moreover, the laser trimming process does not recommend this trimming method as being suitable for a mass production of integrated optical devices.

In view of the above, the object of the present invention is to provide for a method for trimming birefringence of an integrated optical device with at least one waveguide having a birefringence characteristic which is less complicated and may be employed in mass production.

This object is achieved by the method for trimming birefringence as mentioned above, comprising the steps: Providing at least one electrode on top of the waveguide; and applying power equal to or above a predetermined power level to said at least one electrode for causing an irreversible birefringence change of the waveguide.

The inventor has found out that the refractive index change of TE and TM is different if power above a specific level is applied to the electrode. By applying power, the respective waveguide region is heated locally up to a temperature of more than 200° C. The heat causes a change of the stress distribution in the optical waveguide and hence a refractive index variation. After cooling down, the stress distribution of the waveguide region is permanently changed. However, up to now, it is not clear if the variation of the stress distribution is dominated by the electrode or by the glass.

Nevertheless, the refractive index variation and hence the variation of the birefringence of the waveguide makes it possible to reduce the TE-TM shift up to a desired low level. Particularly, it is possible to get rid of the TE/TM shift which remains after the standard fabrication process.

For some applications, a special nonzero birefringence of the waveguide may be required e.g. if the MZI serves as a polarization beam splitter. For this application it is necessary that the birefringence is adjusted to an precise value which can be done by the proposed method.

In contrast to the birefringence trimming proposed in the prior art, the method according to the present invention is technologically much easier. The samples need to have metal electrodes, which are in many cases already there, because they are necessary for switching or wavelength variation of the integrated optical filter. The trimming also requires just a simple power supply in contrast to a laser ablation system.

Moreover, because the result of the birefringence trimming is obtained very fast, the process can be performed even automatically.

In a preferred embodiment, the method comprises the step of measuring the birefringence change, preferably with said at least one electrode by supplying electrical power to said electrode. It is to be understood that other methods for measuring the birefringence change may be contemplated, for example, by measuring the transmission spectrum for the TE- and TM-polarization.

This method step can be performed just a few minutes after the trimming process, which makes possible a fast monitoring of birefringence trimming. This in turn allows a realization of an automatically controlled trimming process.

In a preferred embodiment, the predetermined power level is 0.8 W per electrode length (mm). This power level depends on the used geometry and the materials (glass and electrodes).

The integrated optical device is preferably an optical filter, for example based on a Mach-Zehnder interferometer or a ring resonator. More preferably, it is a thermo optical device.

However, it is to be noted that the inventive birefringence trimming method is also applicable to other optical devices like polarization beam splitters, directional couplers, Fabry-Perot-resonators, and so on. The inventive method is not limited to optical devices based on Mach-Zehnder interferometers.

In a preferred embodiment, the electrode is provided as a metal electrode, preferably as a chromium heater electrode.

An electrode comprising chromium has the advantage that it may endure power levels of up to 7.5 W. However, with different electrode materials or glass cover layers, it may be possible to reach even higher power levels.

The object of the present invention is also solved by an optical device for switching or filtering light passing through a waveguide having a birefringence characteristic, when the waveguide has been treated according to the inventive method as to change its birefringence irreversibly.

Preferably, that waveguide has a core layer sandwiched between a cladding layer, wherein both layers are made of a silica-based material and the cladding is highly doped with a material adapted to balance stresses for TM and TE polarization modes. Preferably, the optical device is a Mach-Zehnder interferometer or a ring resonator.

The same advantages as already described in connection with the inventive method are valid for such an optical device.

Further features and advantages can be taken from the following description and the enclosed drawings.

It is to be understood that the features mentioned above and those yet to be explained below can be used not only in the respective combinations indicated, but also in other combinations or in isolation, without leaving the scope of the present invention.

Embodiments of the invention are shown in the drawings and will be explained more detailed in the description below with reference to same. In the drawings.

Figure 1:
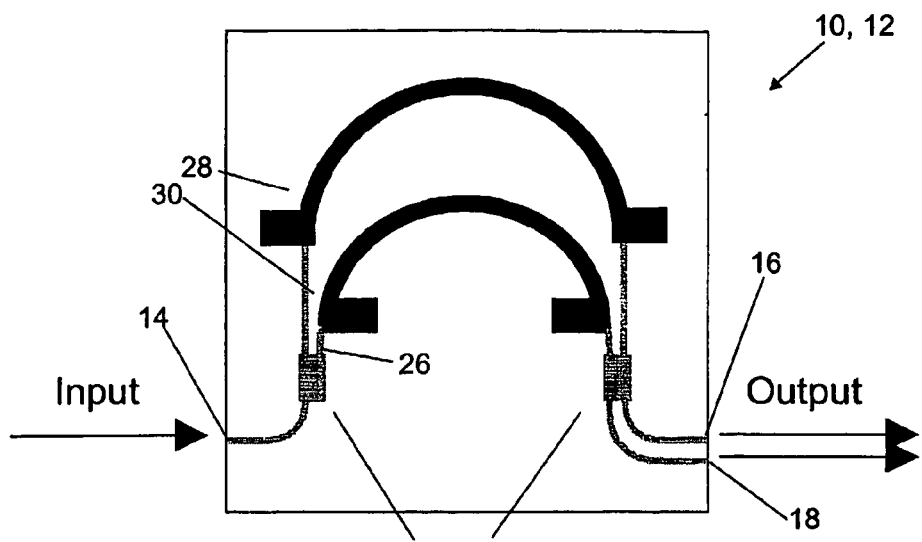
FIG. 1 is a schematic plan view of an optical device based on a Mach-Zehnder interferometer.

In FIG. 1, an optical device is shown schematically and is indicated with reference numeral 10. The optical device is provided as a Mach-Zehnder interferometer 12 being designed as a planar light wave circuit (PLC).

The Mach-Zehnder interferometer 12 (MZI) comprises an input port 14 and two output ports 16, 18. Between the input and output ports 14, 16, 18 two 3 dB couplers 20, 22 are provided. The first 3 dB coupler 20 is fed via the input port 14 and couples light into waveguide arms 24 and 26. The waveguide arms 24, 26 extend to the second 3 dB coupler 22, which is optically coupled with two output ports 16, 18.

As shown in FIG. 1, electrodes 28, 30 are provided above the waveguide arms 24, 26 covering at least a portion of the area where the waveguide arms extend.

Figure 3:
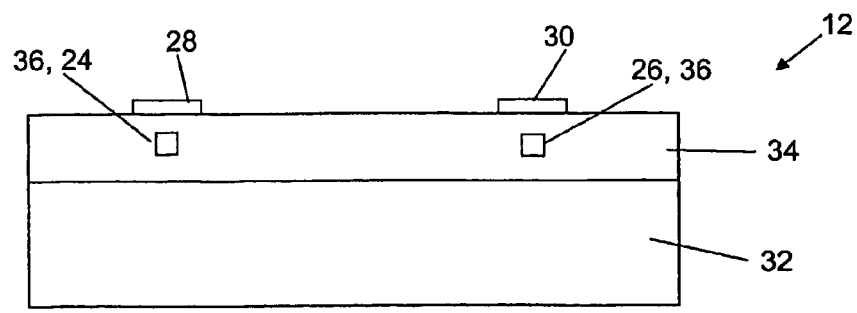
FIG. 3 is a schematic cross-sectional view of a planar light wave circuit (PLC) for explaining its general structure.

In FIG. 3, the general structure of a planar light wave circuit of the MZI 12 is shown cross-sectionally. The circuit comprises a silicon substrate 32 on which a cladding layer 34 is formed. The cladding layer 34 is typically composed of $SiO_2$ glass. Within the cladding layer 34 core portions 36 are embedded. In the present embodiment, the core portions form the waveguide arms 24 and 26. The core portions themselves are made of e.g. $SiO_2$ $TiO_2$ glass.

On the cladding layer 34, the electrodes 28, 30 are formed directly above the core portions 36. The electrodes 28, 30 are for example composed of chromium.

Referring again to FIG. 1, the main function of the MZI is to couple light from the input port 40 either to the upper output port 16 or the lower output port 18. As known in the art, this is achieved by applying power to one of both electrodes in order to heat the region of the waveguide arm. This causes a change of the refractive index of the respective waveguide arm, so that the two light waves traveling through the waveguide arms 24, 26 recombined out of phase and the input signal exits the MZI on the lower output port 18 (bar state). If no power is supplied, the input signal exits the MZI 12 on the upper output port 16 (cross-state).

Although any measure is taken during the fabrication process of the optical device, at least a low birefringence remains. However, even a low birefringence may cause a polarization dependence of the optical device, if for example the free spectral range of the optical device is in the same range as the TE-TM shift caused by the birefringence. In order to comply with certain specifications which require a TE-TM shift of less than 0.75 GHz, the polarization dependence has to be reduced after the fabrication process.

In the present embodiment, the trimming of birefringence is achieved by supplying power to at least one of the electrodes 28, 30 causing the region below the electrodes to be heated.

The inventor has found out that for power levels up to 0.8 W/mm, an equal index change for TE and TM polarization is achieved, however, for power levels above this value of 0.8 W/mm, the index change of TE and TM is different. Hence, in the latter case, the birefringence of the waveguide is changed. This threshold power level may vary if different glass material or electrodes are used.

This characteristic is now used to trim the birefringence of the optical device 10. By applying power of more than 0.8 W/mm to an electrode, a change of the birefringence of $3.5 \times 10^{-5}$ may be achieved. This corresponds to a TE-TM shift of about 4.6 GHz provided that the electrode length and the delay length of the MZI are equal. Hence, this trimming process is able to equalize the TE-TM of less than 4 GHz which is remaining after the typical standard fabrication process.

The refractive index variation is a result of a change of the stress distribution of the optical device. The waveguide region is heated locally up to a temperature of more than 200° C. After cooling down, the stress distribution of the waveguide region is permanently changed. Further, the long-term stability of the birefringence trimming has been checked by heating the optical device at 300° C. for two hours, and no variation of phase and birefringence has been observed due to this heating.

Figure 4:
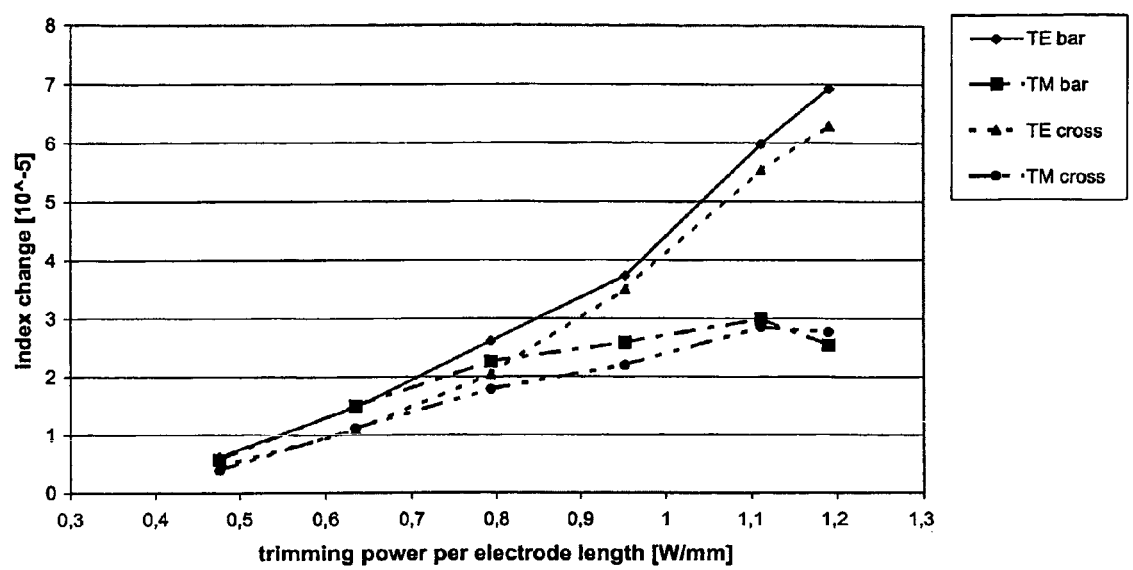
FIG. 4 is a diagram showing the permanent change of the refractive index by elevated heating for different heating power per electrode length.

In the diagram of FIG. 4, the refractive index change is shown. It may clearly be seen that the refractive index change of TE and TM is different above a power level of 0.8 W/mm (power per electrode length).

The diagram of FIG. 4 also shows that an irreversible index change is obtained for a power per electrode length of 0.5 W per electrode length (mm).

The index change itself may be measured by feeding smaller electrical power to the same electrode. This measurement may be performed a few minutes after the aforementioned trimming process. Hence, a fast monitoring of the birefringence trimming is possible allowing a realization of an automatically controlled trimming process.

As already mentioned before, the MZI 12 has been used just as an example of an optical device where the polarization dependence is critical. It is to be understood that the mentioned trimming process may also be used to adjust the birefringence of other optical devices, like ring resonators, polarization beam splitters, mode converters, wave plates, directional couplers, and so on.

Figure 2:
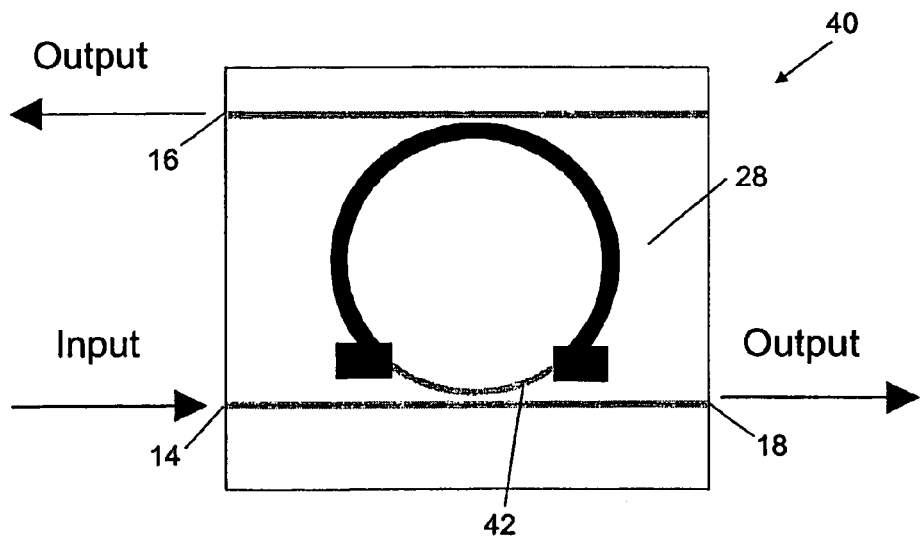
FIG. 2 is a schematic plan view of a ring resonator.

In FIG. 2 for example, a ring resonator 40 is shown. It comprises also one input port 14 and two output ports 16, 18. Further, the ring resonator comprises an electrode 28 which covers the region above a ring shaped waveguide 42. The process for trimming the birefringence of this optical device 40 corresponds to that described in connection with the MZI 12.

Particularly, the trimming method may advantageously be used for optical filters having long delay paths, that is for example for very asymmetric (which means a very low FSR) MZIs. A particular application are MZIs with a FSR of about 10 GHz which corresponds to a delay path of about 2 cm. Such MZIs are used by the receiver of FSK (frequency shift keying) signals, to transform the frequency modulated signal into an amplitude modulated signal for detection. Further, ring resonators with a FSR of about 50 GHz will be used for dispersion compensation. Moreover, a MZI operating as a polarization splitter may be contemplated. In this case, the asymmetric structure may be achieved by waveguides having different widths. Trimming the birefringence serves to adjust the birefringence precisely.

To sum up, a method for trimming birefringence is proposed which allows to alleviate the negative effects of stress-induced birefringence caused during the standard fabrication process. The trimming process may be performed shortly after the fabrication process automatically, so that a mass production of optical devices is possible.

What is claimed is:

1. A method for trimming birefringence of an integrated optical device with at least one waveguide having a birefringence characteristic, comprising the steps:
   providing at least one electrode on top of the waveguide; and
   applying power equal to or above a predetermined power level to said at least one electrode to heat a region of the waveguide for causing an irreversible birefringence change of the waveguide.

2. The method of claim 1, characterized in that said integrated optical device is an optical filter device.

3. The method of claim 2, characterized in that said integrated optical device is a thermo optical device.

4. The method of claim 3, characterized in that said optical filter is a Mach-Zehnder Interferometer or a ring resonator.

5. The method of claim 1, characterized by the step:
   measuring the birefringence change, preferably with said at least one electrode by supplying electrical power to said electrode.

6. The method of claim 1, characterized in that said predetermined power level is 0.8 W/mm.

7. The method of claim 1, characterized in that said electrode is provided as a metal electrode, preferably as a chromium heater electrode.

8. The method of claim 1, wherein the heat causes a change of a stress distribution in the waveguide.

9. The method of claim 1, wherein the region of the waveguide is below the at least one electrode.

10. The method of claim 1, wherein the region of the waveguide is heated to a temperature of more than 200° C.

11. An optical device for switching or filtering light passing through a waveguide having a birefringence characteristic, wherein the waveguide has been treated by providing at least one electrode on top of the waveguide and applying power equal to or above a predetermined power level to said at least one electrode to heat a region of the waveguide for causing an irreversible birefringence change of the waveguide.

12. The optical device of claim 11, characterized in that said waveguide has a core layer sandwiched between a cladding layer, wherein both layers are made of a silica based material and the cladding is highly doped with a material adapted to balance stresses for TE and TM polarization modes.

13. The optical device of claim 11, characterized in that it is a Mach-Zehnder interferometer.

14. The optical device of claim 11, characterized in that it is a ring resonator.

* * * * *